United States Patent
Chen et al.

(10) Patent No.: US 7,932,936 B2
(45) Date of Patent: Apr. 26, 2011

(54) SYSTEM THAT AUTOMATICALLY ADJUSTS THRESHOLD VALUE OF CROSS COLOR SUPPRESSION AND METHOD THEREOF

(75) Inventors: Bing-Jhe Chen, Miaoli County (TW); Po-Wei Chao, Taipei County (TW)

(73) Assignee: Realtek Semiconductor Corp., Hsinchu (TW)

( * ) Notice: Subject to any disclaimer, the term of this patent is extended or adjusted under 35 U.S.C. 154(b) by 589 days.

(21) Appl. No.: 11/862,450

(22) Filed: Sep. 27, 2007

(65) Prior Publication Data

US 2008/0080783 A1 Apr. 3, 2008

(30) Foreign Application Priority Data

Sep. 28, 2006 (TW) ................ 95136065 A

(51) Int. Cl.
*H04N 9/64* (2006.01)
(52) U.S. Cl. ........ 348/241; 348/243; 348/246; 348/247; 348/702; 348/630
(58) Field of Classification Search ............ 348/241, 348/243, 246, 247, 702, 630
See application file for complete search history.

(56) References Cited

U.S. PATENT DOCUMENTS

| 7,379,122 B2 | 5/2008 | Bae et al. | |
|---|---|---|---|
| 2005/0030381 A1* | 2/2005 | Tanigawa | 348/155 |
| 2005/0134745 A1* | 6/2005 | Bacche et al. | 348/702 |

FOREIGN PATENT DOCUMENTS

CN 1581943 2/2005

* cited by examiner

*Primary Examiner* — Yogesh K Aggarwal
(74) *Attorney, Agent, or Firm* — Thomas, Kayden, Horstemeyer & Risley, LLP

(57) ABSTRACT

A system that automatically adjusts a threshold value of cross color suppression and a method thereof are disclosed. The system includes a cross color suppression unit, a statistical unit and an adjustment unit. The cross color suppression unit is for receiving input video data and searching a plurality of cross color dots thereof. According to a threshold value, the cross color suppression unit determines whether the cross color dot is static or dynamic, suppresses the static cross color dot and then generates an output video data. The method used by the present invention is, the statistical unit calculates residual cross color amount of the output video data that has been suppressed. Then, the adjustment unit compares the cross color amount of the output video data with a reference value so as to send a corresponding adjustment signal to the cross color suppression unit to adjust the threshold value.

11 Claims, 2 Drawing Sheets

SYSTEM THAT AUTOMATICALLY ADJUSTS THRESHOLD VALUE OF CROSS COLOR SUPPRESSION AND METHOD THEREOF

BACKGROUND OF THE INVENTION

The present invention pertains to an adjustment system that automatically adjusts a threshold value of cross color suppression and the method thereof.

The input signal currently available includes a chrominance signal and a luminance signal, overlapping at a carrier. When the monitor receives the input signal, the chrominance signal and the luminance signal are displayed on the monitor respectively. Due to overlapping, part of the carrier is not precisely divided. The chrominance and the luminance can't be reconstructed by the monitor so that the luminance information is interpreted as color information and the Cross-Color Artifact appears. This leads to poor image quality of the monitor and influences one's sense of vision.

Before processing cross color suppression, the images are checked to determine whether they are static or dynamic. When the dynamic cross color dots are suppressed, the output video data may have certain side effects such as broken or dotted images.

The system utilizes a threshold value to determine the status of the dots of the image. The status of the cross color dots is determined by a comparison with the threshold value information. Thus, the cross color is effectively suppressed with no side effects such as broken or dotted images on the video image. However, a set of threshold values is not enough to respond with various front end devices such as Digital Video Disc (DVD) Players, or Video Decoders. The above-mentioned devices perform a variety of processing on the video data for respective operations so that a set of thresholds preset to a cross color suppression circuit are inappropriate for different input video data. Thus, the cross color artifact of the input video data cannot be effectively suppressed.

In accordance with the above description, the cross color suppression circuit is still under the influence of the processing of the front end devices so that the preset or adjusted threshold value will not work out as expected while suppressing the cross color. Hence, users might need to readjust the threshold value for suppressing the cross color of the video data, which renders the process time-consuming and inefficient.

SUMMARY OF THE INVENTION

Therefore a primary objective of this invention is to provide a system that automatically adjusts the threshold value of cross color suppression. This invention effectively suppresses the cross color of video data by automatically adjusting the threshold value according to the residual cross color of the video data being suppressed.

Another objective of this invention is to provide a system that automatically adjusts threshold value for cross color suppression and a method thereof which resets the threshold value to an initial value during a scene change in video data so as to avoid broken or dotted images caused by suppression of dynamic cross color dots.

This invention, with the system that automatically adjusts threshold value, includes a cross color suppression unit, a statistical unit, and an adjustment unit. The cross color suppression unit is designed to receive an input video data and to search through a plurality of cross color dots thereof. In accordance with a threshold value, the cross color suppression unit determines whether the cross color dot is static or dynamic, suppresses the static cross color dot, and then generates an output video data. The statistical unit receives the suppressed output video data and calculates the cross color amount of this data. Then the adjustment unit compares the cross color amount of the suppressed output video data with a reference value so as to send a corresponding adjustment signal to the cross color suppression unit to adjust the threshold value.

This invention's system also includes a reset unit that detects scene changes of the input video data. Once there is a scene change in the video data, a reset signal is sent to the cross color suppression unit to reset the threshold value to its original value. As a result, broken or dotted images caused by the suppression of dynamic cross color dots can be avoided.

BRIEF DESCRIPTION OF THE DRAWINGS

The structure and technical means of this invention to achieve the above functions and other objects can be best understood by referring to the following detailed description of the preferred embodiments and the accompanying drawings, wherein.

DETAILED DESCRIPTION

Figure 1:
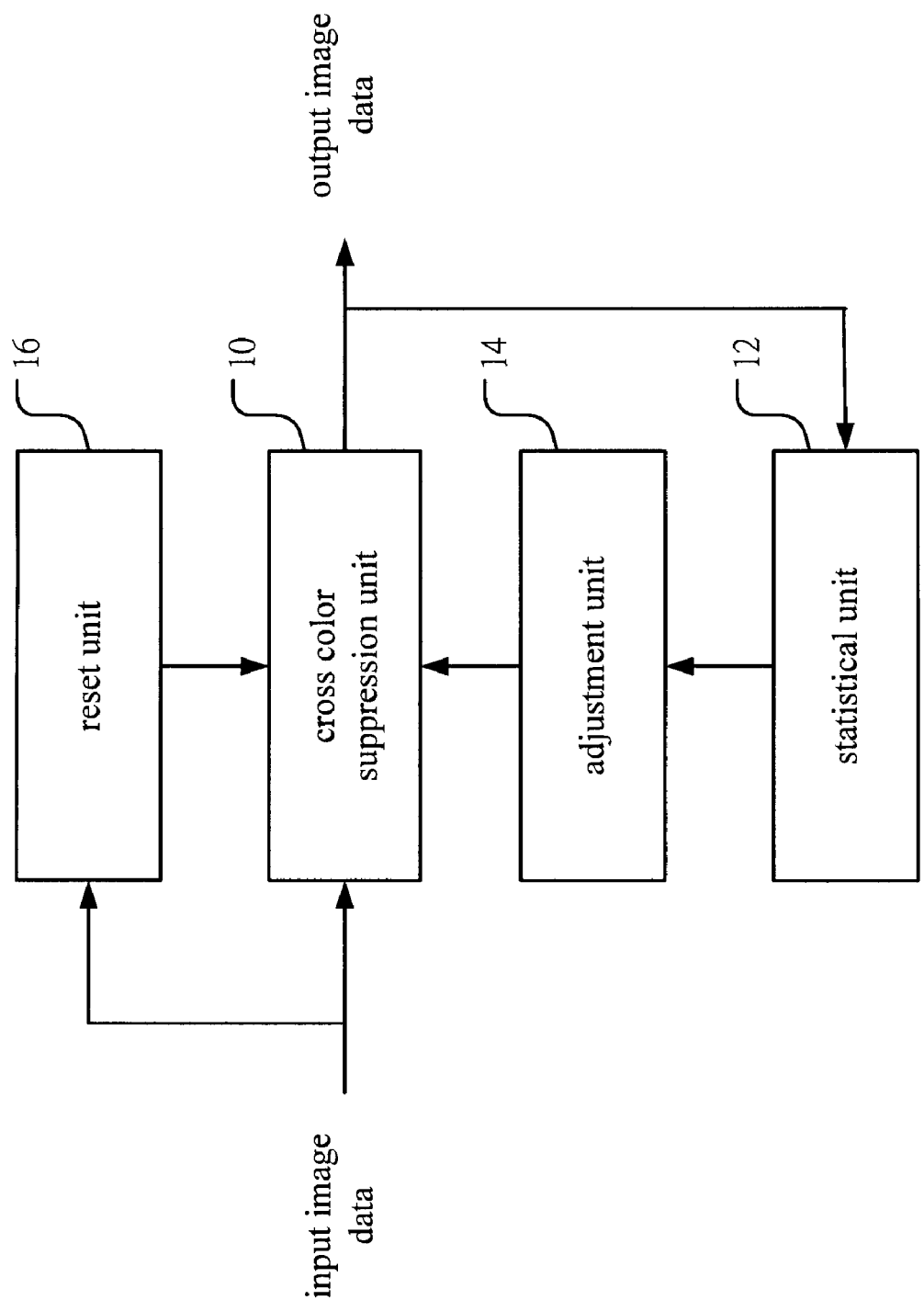
FIG. 1 is a block diagram of an embodiment according to the present invention.

FIG. 1 refers to an embodiment of the present invention that automatically adjusts threshold value of cross color suppression and includes a cross color suppression unit 10, a statistical unit 12 and an adjustment unit 14. The cross color suppression unit 10 receives input image data and searches all cross color dots of the input image data. The cross color suppression unit 10 searches all cross color dots by means of field, frame or line. There are several different ways to search cross color dots of image data, whereas the methods mentioned are only a few of those that are applied by the cross color suppression unit 10.

Furthermore, the cross color suppression unit 10 is preset with a threshold value that defines dynamic or static status of cross color dots. The cross color suppression unit 10 determines the status of the cross color dots of the input video data according to the threshold value. In an embodiment of the present invention, the cross color suppression unit 10 determines whether the cross color dot is dynamic or static by means of a mathematical technique for motion detection-SAD (Sum of Absolute Difference). Thus, the threshold value is set as an SAD value. After distinguishing between static and dynamic cross color dots, the cross color suppression unit 10 suppresses the statistic cross color dots and generates an output video data. In an embodiment of the present invention, a 3D Comb Filter is used to deal with the static cross color dot to improve image quality.

Referring back to FIG. 1, the statistical unit 12 is used to estimate the cross color amount of the output video data, meaning the amount of cross color dots. Thus, the residual cross color of the input video data that has already been suppressed by the cross color suppression unit 10 in accordance with the predetermined threshold value is learned. The adjustment unit 14 has a preset reference value that defines the cross color amount of the input video data that is acceptable by viewers. Once the residual cross color amount of the output video data, which is generated after being suppressed by the cross color suppression unit 10, is smaller than the reference value, it means the cross color suppression unit 10 has good cross color suppression effect. However, if the residual cross color amount of the output video data is larger than the reference value, it means the cross color suppression unit 10 has poor cross color suppression effect. In this case, the preset threshold value of the cross color suppression unit 10 is not suitable for the current input video data being sent to the cross color suppression unit 10 and the preset threshold value needs to be adjusted.

In an embodiment of the present invention, the adjustment unit 14 compares the cross color amount of the output video data with the reference value so as to learn the effect of the cross color suppression unit 10. If the effect of the cross color suppression is poor, a corresponding adjustment signal is immediately sent to the cross color suppression unit 10 to automatically adjust the threshold value. In an embodiment of the present invention, the cross color suppression unit 10 automatically adjusts the threshold value by presetting a fixed adjustment value. While receiving the adjustment signal, the cross color suppression unit 10 can automatically adjust the threshold value in accordance with this fixed adjustment value, or a number of sets of threshold values that are predetermined. Each time the cross color suppression unit 10 receives the adjustment signal, it automatically adjusts the threshold value by selecting one of the sets of threshold values sequentially. The reference value of the adjustment unit 14 can be adjusted freely by users. Therefore, the system of the present invention automatically adjusts the threshold value according to the residual cross color amount of the output video data that has been suppressed. Thus, the cross color of the video data is effectively suppressed. Furthermore, in order to avoid the cross color suppression unit 10 from mistaking a dynamic cross color dot as static due to the previously adjusted threshold value, there is a reset unit 16 in an embodiment of the present invention for detecting scene changes in the input video data. Once there is a scene change in the input video data, a reset signal is sent to the cross color suppression unit 10, causing it to reset the threshold value to its initial value. As a result, the broken or dotted images caused by mistaking between a dynamic and static cross color dot due to a previously adjusted threshold value can be avoided. Therefore, the cross color is effectively suppressed by the present invention.

In addition, the system of the present invention can be applied to video decoders, TV controllers or MPEG (Moving Picture Experts Group) decoders, and so on.

Figure 2:
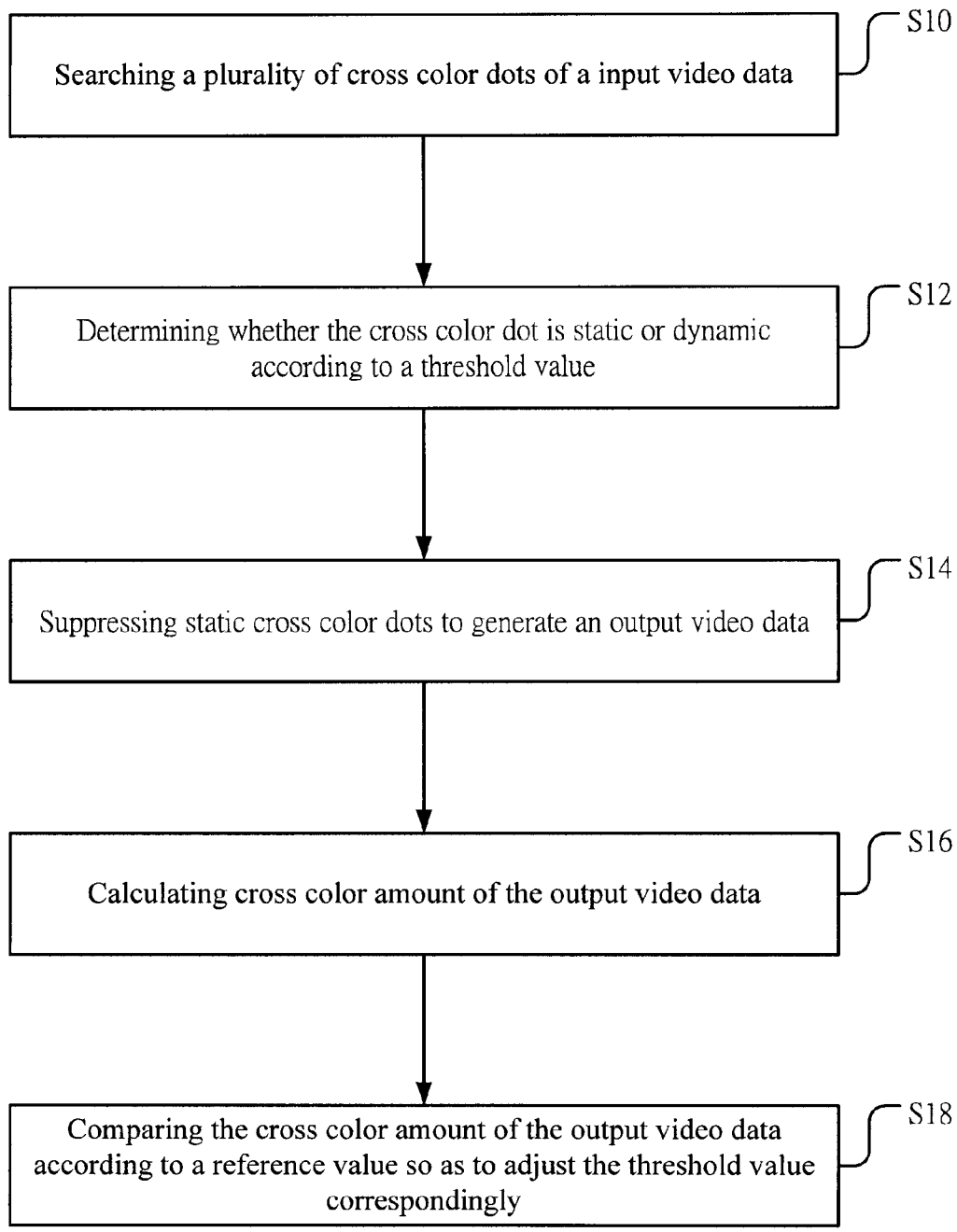
FIG. 2 is a flow chart of an embodiment according to the present invention.

FIG. 2 represents a flow chart of an embodiment of the present invention. When input video data is transmitted to the cross color suppression unit 10, step S10 is activated which searches a number of cross color dots of the input video data by means of field, frame or line. Next, step S12 determines whether the cross color dot is static or dynamic according to a threshold value. SAD is used to detect the motion of the cross color dot while the threshold value is an SAD value. Afterwards, in step S14, the static cross color dots are suppressed to generate an output video data. A 3D Comb Filter may be used to suppress the static cross color dots.

The step S16 calculates the cross color amount of the output video data being suppressed. Then step S18 is taken to compare the cross color amount of the output video data with a reference value for the adjustment of the threshold value. This step checks whether the cross color amount of the output video data matches the reference value. If it does, the threshold value is not adjusted. If it does not, the threshold value is adjusted. This is one of the embodiments of how the present invention automatically adjusts the threshold value according to the cross color amount of the video data that has been suppressed so that cross color of the input video data can be suppressed effectively. Furthermore, in the Step S10, it is determined whether or not the input video data has a scene change. If the input video data has a scene change, the threshold value is reset to its initial value.

In conclusion, this invention includes a system that automatically adjusts the threshold value for cross color suppression and consists of a cross color suppression unit, a statistical unit and an adjustment unit. The method of automatically adjusting the threshold value of cross color suppression includes several steps. First, the cross color suppression unit searches a number of cross color dots of input video data. Then, the cross color suppression unit determines whether the cross color dot is static or dynamic according to a threshold value so as to suppress the static cross color dot and generate an output video data. Next, the statistical unit calculates the cross color amount of the output video by the statistical unit. After that the adjustment unit compares the cross color amount of the output video data with a reference value so as to send a corresponding adjustment signal to the cross color suppression unit to adjust the threshold value. Therefore, the threshold value is adjusted automatically and the cross color artifact of the video data is effectively suppressed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A method that automatically adjusts a threshold value of cross color suppression comprising the steps of:
    searching a plurality of cross color dots of an input video data;
    determining whether each of the cross color dots is static or dynamic according to the threshold value, wherein the step of determining whether each of the cross color dots is static or dynamic according to a threshold value is by means of SAD (Sum of Absolute Difference) while the threshold value is a SAD value;
    suppressing the static cross color dots and generating an output video data;
    calculating a cross color amount of the output video data; and
    comparing the cross color amount of the output video data according to a reference value so as to adjust the threshold value correspondingly.

2. The method as claimed in claim 1, wherein the method further comprising the steps of:
    determining whether the input video data has scene change; and
    resetting the threshold value to its initial value when there is a scene change of the input video data.

3. The method as claimed in claim 1, wherein the step of suppressing the static cross color dots is by means of a multiple-dimensional comb filter to suppress the static cross color dots.

4. The method as claimed in claim 1, wherein the method is applied to video decoders, TV controllers or MPEG (Moving Picture Experts Group) decoders.

5. The method as claimed in claim 1, wherein the step of searching a plurality of cross color dots of the input video data is by means of field, frame or line.

6. A system that automatically adjusts a threshold value of cross color suppression comprising:
    a cross color suppression unit that receives an input video data and searches a plurality of cross color dots thereof, determines whether each of the cross color dots is static or dynamic according to a threshold value, suppresses the static cross color dot and then generates an output video data, wherein the cross color suppression unit determines whether each of the cross color dot is static or dynamic by SAD (Sum of Absolute Difference) while the threshold value is a SAD value;

a statistical unit that receives the output video data and calculates cross color amount of the output video data; and an adjustment unit that receives and compares the cross color amount from the statistical unit with a reference value so as to send a corresponding adjustment signal to the cross color suppression unit for adjustment of the threshold value.

7. The system as claimed in claim 6, wherein the system further comprising:

a reset unit that detects scene change of the input video data.

8. The system as claimed in claim 7, wherein once there is a scene change of the video data, a reset signal is sent to the cross color suppression unit for resetting the threshold value to its original value.

9. The system as claimed in claim 6, wherein the cross color suppression unit suppresses the static cross color dots by a multiple-dimensional comb filter.

10. The system as claimed in claim 6, wherein the system is applied to video decoders, TV controllers or MPEG (Moving Picture Experts Group) decoders.

11. The system as claimed in claim 6, wherein the cross color suppression unit searches the cross color dots of the input video data by means of field, frame or line.

* * * * *